United States Patent
Liu et al.

(10) Patent No.: US 11,736,632 B2
(45) Date of Patent: Aug. 22, 2023

(54) DEVICE MONITORING METHOD, APPARATUS, SERVER, AND STORAGE MEDIUM

(71) Applicant: Zhuhai Pantum Electronics Co., Ltd., Zhuhai (CN)

(72) Inventors: Zhongsong Liu, Zhuhai (CN); Guodong Wang, Zhuhai (CN); Yuanpei Zhao, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/684,658

(22) Filed: Mar. 2, 2022

(65) Prior Publication Data

US 2022/0294916 A1 Sep. 15, 2022

(30) Foreign Application Priority Data

Mar. 12, 2021 (CN) .......................... 202110270986.4

(51) Int. Cl.
*G06F 3/12* (2006.01)
*G06K 15/02* (2006.01)
*H04N 1/00* (2006.01)

(52) U.S. Cl.
CPC ..... *H04N 1/00323* (2013.01); *H04N 1/00042* (2013.01); *H04N 1/00061* (2013.01)

(58) Field of Classification Search
None
See application file for complete search history.

(56) References Cited

U.S. PATENT DOCUMENTS

| | | | |
|---|---|---|---|
| 6,978,374 B1 * | 12/2005 | Hansen | G06F 21/71 713/189 |
| 2003/0134675 A1 | 7/2003 | Oberberger | |
| 2012/0131681 A1 * | 5/2012 | Layson | G06F 21/125 726/28 |
| 2014/0101311 A1 | 4/2014 | Smeets | |

(Continued)

FOREIGN PATENT DOCUMENTS

| | | | | |
|---|---|---|---|---|
| CN | 102419804 | * | 4/2012 | .......... G06F 21/125 |
| CN | 102426640 | * | 4/2012 | .......... G06F 21/121 |

(Continued)

*Primary Examiner* — Beniyam Menberu
(74) *Attorney, Agent, or Firm* — Anova Law Group, PLLC

(57) ABSTRACT

Embodiments of the present disclosure provide a device monitoring method, an apparatus, a server, and a storage medium. The method includes receiving an authorization code, where the authorization code includes first information; the first information is configured to indicate a first value; and the first value is a maximum quantity of image forming devices capable of being monitored by a device monitoring system which is activated by the authorization code; determining the first value according to the authorization code; and configuring a first parameter value according to the first value, where the first parameter value is configured to record the maximum quantity of image forming devices capable of being monitored. The present disclosure reduces the data processing amount of the server where the device monitoring system is located, improves the monitoring effect of the device monitoring system on the image forming device and improves the user experience.

16 Claims, 8 Drawing Sheets

(56) References Cited

U.S. PATENT DOCUMENTS

2014/0283011 A1     9/2014  Orona et al.
2019/0288963 A1*    9/2019  Sugimoto ............... H04L 67/51

FOREIGN PATENT DOCUMENTS

| CN | 107122630 A |   | 9/2017  |                |
|----|-------------|---|---------|----------------|
| EP | 2736010 B1  |   | 3/2019  |                |
| JP | 2005354516  | * | 12/2005 | ...... H04N 1/00 |
| JP | 2008098844  | * | 4/2008  | ...... H04N 1/00 |
| JP | 2017004418  | * | 1/2017  | ...... G06F 3/12 |

* cited by examiner

DEVICE MONITORING METHOD, APPARATUS, SERVER, AND STORAGE MEDIUM

CROSS-REFERENCE TO RELATED APPLICATION

This application claims priority to Chinese patent application No. 202110270986.4, filed on Mar. 12, 2021, in the China National Intellectual Property Administration, the entirety of which is incorporated herein by reference.

TECHNICAL FIELD

The present disclosure generally relates to the field of image forming device technology and, more particularly, relates to a device monitoring method, an apparatus, a server, and a storage medium.

BACKGROUND

Image forming devices, such as printers, are widely used in daily operations regardless of large enterprises or small enterprises, government agencies, commercial institutions, or private enterprises. Due to a large quantity of image forming devices, a server installed with a device monitoring system may normally be installed, and the server may monitor the usage, configuration, and status of each image forming device through the device monitoring system.

However, inventors of present application have found that if there are excessive number of image forming devices monitored by the device monitoring system, the data processing capacity of the server where the device monitoring system is located may be too large, thereby affecting the monitoring effect of the device monitoring system on the image forming devices and reducing the user experience.

SUMMARY

One aspect of embodiments of the present disclosure provides a device monitoring method. The method includes receiving an authorization code, where the authorization code includes first information; the first information is configured to indicate a first value; and the first value is a maximum quantity of image forming devices capable of being monitored by a device monitoring system which is activated by the authorization code; determining the first value according to the authorization code; and configuring a first parameter value according to the first value, where the first parameter value is configured to record the maximum quantity of image forming devices capable of being monitored.

One aspect of embodiments of the present disclosure provides a device monitoring apparatus. The apparatus includes a receiving unit, configured to receive the authorization code, where the authorization code includes the first information, the first information is configured to indicate the first value, and the first value is the maximum quantity of image forming devices that can be monitored by the device monitoring system activated using the authorization code; a determining unit, configured to determine the first value according to the authorization code; and a configuring unit, configured to configure the first parameter value according to the first value, where the first parameter value is configured to record the maximum quantity of image forming devices that can be monitored.

Another aspect of embodiments of the present disclosure provides a server including a processor for implementing an image forming control method, where the processor is configured to: receive an authorization code, where the authorization code includes first information; the first information is configured to indicate a first value; and the first value is a maximum quantity of image forming devices capable of being monitored by a device monitoring system which is activated by the authorization code; determine the first value according to the authorization code; and configure a first parameter value according to the first value, where the first parameter value is configured to record the maximum quantity of image forming devices capable of being monitored.

Another aspect of embodiments of the present disclosure provides a non-transitory computer-readable storage medium, containing a computer program for, when being executed by a processor, performing an image forming control method. The image forming control method includes receiving an authorization code, where the authorization code includes first information; the first information is configured to indicate a first value; and the first value is a maximum quantity of image forming devices capable of being monitored by a device monitoring system which is activated by the authorization code; determining the first value according to the authorization code; and configuring a first parameter value according to the first value, where the first parameter value is configured to record the maximum quantity of image forming devices capable of being monitored.

Another aspect of embodiments of the present disclosure provides a computer program. When being executed by a computer, the computer program is configured to execute the above-mentioned method.

Other aspects of the present disclosure can be understood by those skilled in the art in light of the description, the claims, and the drawings of the present disclosure.

DETAILED DESCRIPTION

Figure 1:
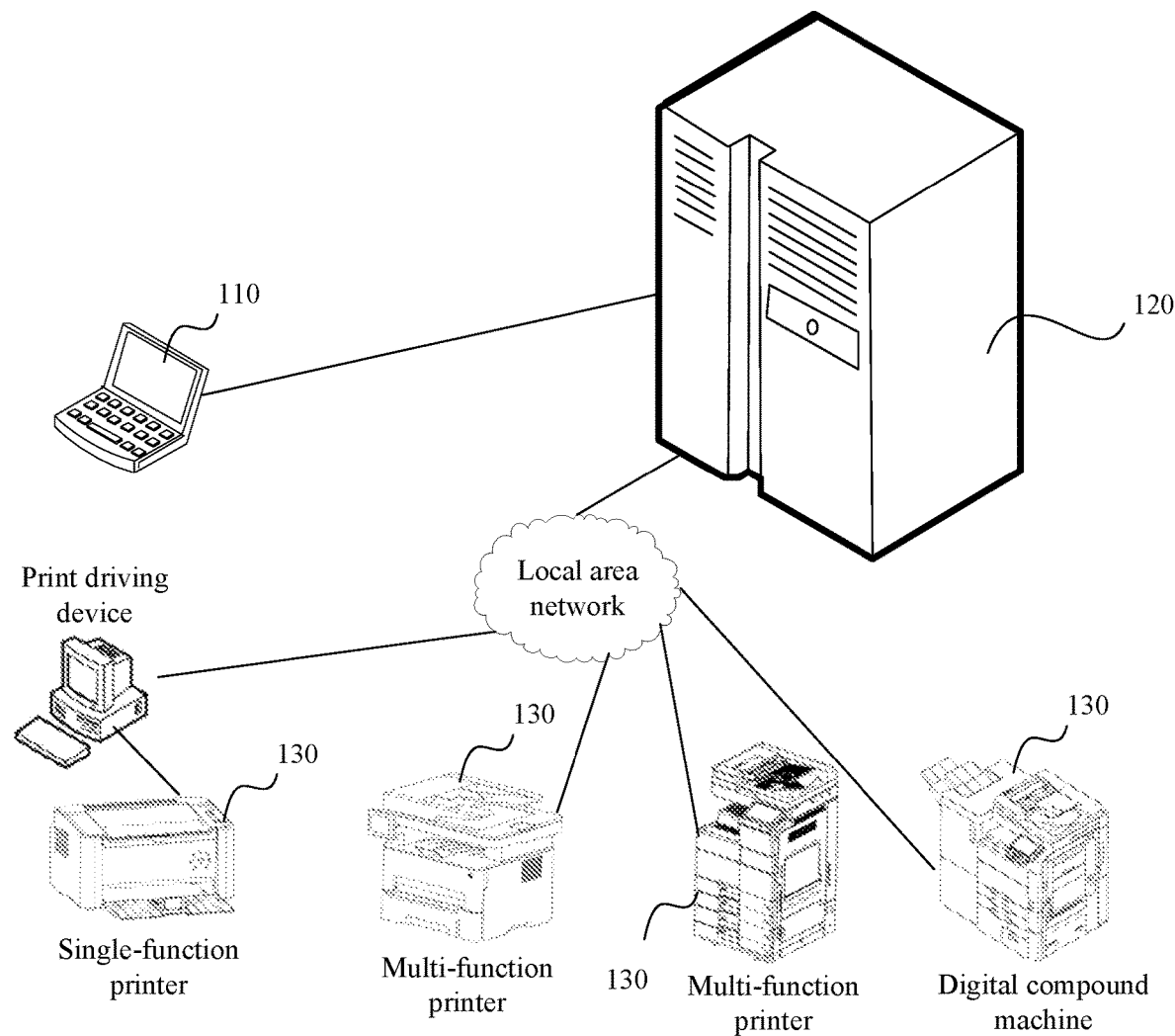
FIG. 1 illustrates a schematic of an applicable scenario of a device monitoring method provided by exemplary embodiments of the present disclosure.

The terms used in embodiments of the present disclosure are only used to describe embodiments of the present disclosure and are not intended to limit the present disclosure.

Regardless of whether it is a large enterprise or a small enterprise, a government institution, a commercial institution or a private enterprise, computers and image forming devices such as printers are widely used in daily operations. Computers and image forming devices are normally used for various business functions, including creating internal documents, such as memos, presentations, various records, procedures, and the like, and creating external documents, such as brochures, statements, and the like for patients or clients.

For such business tasks, the use frequency of image forming devices may increase, and thus there is a need to monitor the usage, configuration, and status of the image forming devices. Taking a printer as an example, it is desirable to know how many pages the printer has printed in a given time duration, so that the right amount of paper may be prepared for the printer to use; similarly, it is desirable to determine the status of a printer's toner or ink supply, so that appropriate supply levels may be maintained; in addition, it is desirable to obtain other useful data such as device maintenance meter data and configuration data, firmware level, toner cartridge identification or serial number, and storage disk size. Furthermore, with rapid popularization of printers, there are more printers of different models in more places.

In one embodiment, a server in which a device monitoring system is installed may be configured; and the server may monitor the usage, configuration, and status of each image forming device through the device monitoring system installed therein.

The inventors found that if there are excessive image forming devices monitored by the device monitoring system, data processing capacity of the server where the device monitoring system is located may be excessively large, thereby affecting the monitoring effect of the device monitoring system on the image forming devices and reducing user experience.

Therefore, the present disclosure provides a device monitoring method, a device, a server, and a storage medium, which can reduce the data processing amount of the server where the device monitoring system is located, improve the monitoring effect of the device monitoring system on the image forming device and improve the user experience.

The device monitoring method of the present disclosure may be applied to a managed print service (MPS).

First, the nouns involved in the present disclosure are exemplarily, not restrictively, described.

The image forming device is a device having at least one function related to image formation. Above-mentioned functions related to image formation may include, but be limited to, a printing function, a scanning function, a copying function, and a facsimile function.

A single-function printer is an image forming device with a printing function only.

A multi-function printer is an image forming device with printing, copying, scanning and/or faxing functions, and the quantity of paper trays may be selectively configured.

For a digital compound machine, based on the copying function with standard or optional printing, scanning, faxing functions, the file output may be performed through a laser printing manner using digital principle, and images and texts may be edited as needed. The digital compound machine may have a relatively large capacity paper tray, high memory, large hard disk, strong network support and multitasking parallel processing capability.

The print driving device may an electronic device with an installed print driver, such as a computer.

The applicable scenarios of the device monitoring method of the present disclosure are exemplarily illustrated. The exemplary schematic of an applicable system of the device monitoring method is shown in FIG. 1. The system may include the first electronic device 110, the second electronic device 120, and a plurality of image forming devices 130.

The first electronic device 110 and the second electronic device 120 may be communicatively connected with each other.

The second electronic device 120 and each of the image forming devices 130 may be communicatively connected with each other. Above-mentioned image forming devices 130 may include, but not be limited to, following devices shown in FIG. 1 including a single-function printer, a multi-function printer, a digital compound machine, and the like.

The connection manner between the second electronic device 120 and each image forming device 130 may not be limited in various embodiments of the present disclosure. In an optional implementation manner, the second electronic device 120 and the image forming device 130 may be connected through a local area network. For example, in the scenario shown in FIG. 1, the multi-function printer and the digital composite machine may be respectively connected to the second electronic device 120 through a local area network. In another optional implementation manner, the image forming device 130 may be connected to the second electronic device 120 through a third-party device. For example, in the scenario shown in FIG. 1, the single-function printer may be connected to the second electronic device 120 through a print driving device.

Figure 2:
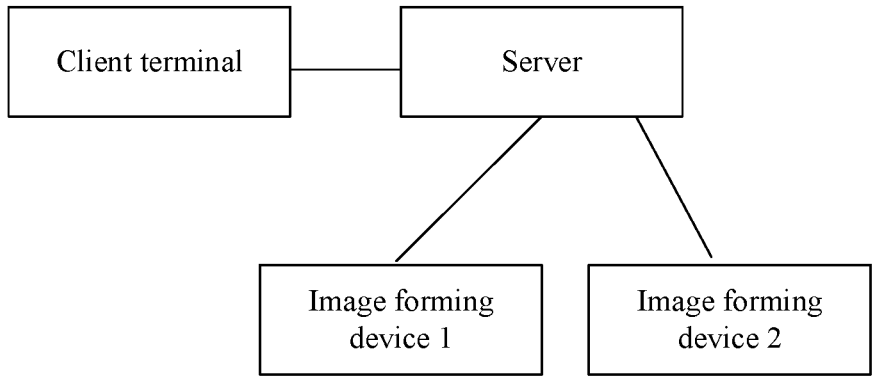
FIG. 2 illustrates a structural schematic of a device monitoring system provided by exemplary embodiments of the present disclosure.

To realize the monitoring of the image forming device, in addition to the above-mentioned communication connection, it is also needed to install service software, which is referred to the device monitoring system hereinafter, in the first electronic device 110 and the second electronic device 120 respectively for monitoring the image forming device. The device monitoring system may be provided by a service provider of the image forming device (e.g., a printer manufacturer). A client terminal program may be installed in the first electronic device 110 as a client terminal of the device monitoring system, and a server program may be installed in the second electronic device 120 as a server of the device monitoring system, thereby obtaining, for example, the device monitoring system shown in FIG. 2. The first electronic device 110 and the second electronic device 120 may be independent electronic devices, respectively; or the functions of the first electronic device 110 and the second electronic device 120 may be implemented by a same electronic device in any suitable manner.

However, before using the device monitoring system to monitor the image forming device, a user may normally need to input an authorization code of the device monitoring system on the client terminal. The authorization code is information for activating the software, the server may perform activation verification on the authorization code, and if the verification is successful, the device monitoring system is activated. Then, the user may use the client terminal to introduce identification information (e.g., IP address, hostname, and the like) of the image forming device to be monitored into the server, and in the case that the introduced image forming device has completed the communication connection with the server, the server may monitor the introduced image forming device.

During a monitoring process, the server may acquire and store the service information of each image forming device being monitored, and the user may access the server at the client terminal and view the service information of the image forming device being monitored. Above-mentioned service information may include, but not be limited to, configuration information, usage information, and status information of the image forming device. The configuration information may include various configuration parameters of the image forming device such as device maintenance meter data and configuration data, firmware level, toner cartridge identification, serial number, storage disk size, and the like. The usage information may include usage information of the image forming device, such as how many pages are printed, how many pages are copied, and the like. The status information may include status information of hardware devices in the image forming device, such as supply status of toner or ink, whether there is hardware malfunction, and the like.

If the quantity of image forming devices that can be monitored by the device monitoring system is not limited and if there are excessive image forming devices introduced into the device monitoring system, that is, the server needs to monitor excessive image forming devices, the data processing volume of the server may be excessively large. Therefore, the data processing efficiency of the server may be affected, which may further affect the monitoring effect of the device monitoring system on the image forming device. For example, the problems that the server response speed is too slow when the user uses the client terminal to access the server may occur, which may reduce the user experience.

Therefore, in the device monitoring method of the present disclosure, the first parameter may be configured for the device monitoring system to limit the maximum quantity of image forming devices that the device monitoring system can monitor and prevent the server from various problems caused by excessive image forming devices being monitored by the server mentioned above.

Furthermore, in the device monitoring method of the present disclosure, the authorization code may be used to carry the maximum quantity of image forming devices that may be monitored by the device monitoring system and be activated by using the authorization code. That is, the authorization code in the device monitoring method of the present disclosure may not only be used as information for activating the device monitoring system, but also indicate the maximum quantity of image forming devices that can be monitored by the device monitoring system.

The authorization code in various embodiments of the present disclosure may be provided to the user by the provider of the device monitoring system. For example, the user may provide the following information to the provider of the device monitoring system, including the device identification (such as central processing unit (CPU) identification (ID), IP address, hostname, and the like) of the first electronic device and the second electronic device shown in FIG. 1, the quantity of image forming devices to be monitored, and the product serial number of the device monitoring system. Then, the provider of the device monitoring system may generate an authorization code based on the information and transmit the code to the user.

Various embodiments of the present disclosure may not limit the implementation form of the authorization code, as long as it can be used as activation information of the device monitoring system and can indicate the maximum quantity of image forming devices that can be monitored by the device monitoring system and be activated by using the authorization code.

The authorization code may include, but not be limited to, the activation information and the first information. The activation information may be configured to activate the device monitoring system; the first information may be configured to indicate the first value; and the first value may be the maximum quantity of image forming devices that can be monitored by the above-mentioned device monitoring system and be activated using the authorization code. The activation information may include, but not be limited to, software type, device identification, year, month, and day of generating the authorization code, product serial number, and the like. In an optional implementation manner, the device monitoring system may perform activation verification on the authorization code according to the activation information in the authorization code, or the device monitoring system may perform activation verification on the authorization code according to the activation information and the first information in the authorization code to determine whether the device monitoring system is activated. The implementation of the first information is described hereinafter.

In the first optional implementation manner, the first information may directly carry the first value. For example, the authorization code may be a string of characters, and some characters at specified positions in the string may be the above-mentioned first value. For example, the authorization code may be a 16-bit string, the following information may be indicated by this string: software type (such as Xinchuang, domestic general, or international), year, month, and day when the authorization code was generated, the first information, and product serial number; every 4 bits in the string is a segment; there are connecting lines—between segments; and each type of information may be indicated by a plurality of characters in the string. If the authorization code is 0121-0202-0100-4678, and the string in the third segment (i.e., the 9th to 12th bits) is the first information, then the first information carried by the authorization code is 0100, that is, the first value is 100. That also is, the maximum quantity of image forming devices that can be monitored by the device monitoring system and be activated with the authorization code is 100.

In the second optional implementation manner, the first information may not directly carry the first value, but carry information obtained by performing data processing on the first value, for example, the first information may be a numerical string obtained by performing a specified mathematical operation on the first value. For example, the authorization code may be a string of characters, some characters in specified positions in the string may be the above-mentioned first information, and the first value may be obtained by performing a preset operation on the first information. The above-mentioned preset operation may be an operation manner such as addition, subtraction, multiplication, division, exponentiation operation, and reciprocal operation, or a combination of at least two operation manners. Still taking the authorization code as 0121-0202-0100-4678 as an example, 13th to 16th characters of the string is the first information, then the first information is 4678. Assuming that the default operation is an addition operation, the first value calculated according to the first information 4678 is 4+6+7+8=25. That is, the maximum quantity of image forming devices that can be monitored by the device monitoring system and be activated with this authorization code is 25.

In the third optional implementation manner, the authorization code may be the result of visualizing encrypted data, which may be decrypted only with a key, and the decrypted data may be structured and related to each other. For example, the decrypted authorization code may be the authorization code in the first optional implementation manner and the second optional implementation manner described above.

The implementation of the device monitoring method of the present disclosure is described below through various embodiments.

Figure 3:
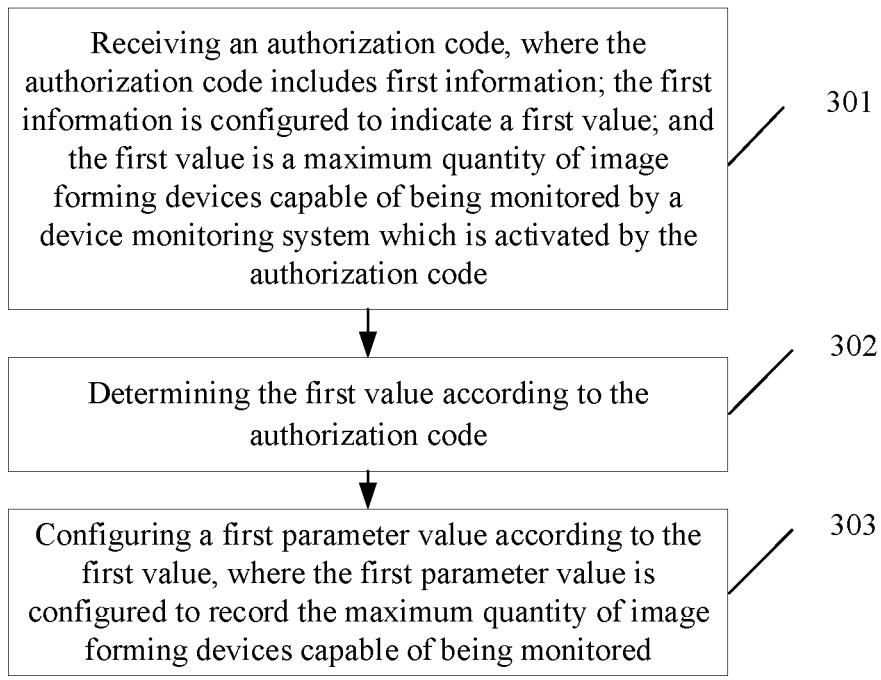
FIG. 3 illustrates a flowchart of an exemplary device monitoring method provided by exemplary embodiments of the present disclosure.

FIG. 3 illustrates a flowchart of an exemplary device monitoring method provided by exemplary embodiments of the present disclosure. The method may be applied to the above-mentioned server. As shown in FIG. 3, the method may include:

301, receiving an authorization code, where the authorization code may include the first information, the first information may be configured to indicate the first value, and the first value may be the maximum quantity of image forming devices capable of being monitored by a device monitoring system which is activated by the authorization code.

302, determining the first value according to the authorization code; and 303, configuring the first parameter value according to the first value, where the first parameter value may be configured to record the maximum quantity of image forming devices capable of being monitored.

Optionally, before the device monitoring system is activated, the first parameter value may be a default value or 0, and the user may not use the device monitoring system to monitor the image forming device; or a second value may also be preset for the first parameter value, which may be significantly less than the first value, so that the device monitoring system may only monitor a relatively small quantity of image forming devices before the device monitoring system is activated. For example, the first value may be 100, the second value may be 3, such that before the device monitoring system is activated, the device monitoring system may only monitor a maximum of 3 image forming devices and may monitor a maximum of 100 image forming devices after activation.

For 302, based on the above-mentioned description of the authorization code, if the authorization code is not encrypted, the first information may include the first value, then 302 may include extracting the first value from specified positions of the authorization code; if the authorization code is not encrypted, the first information may be the information obtained by performing data processing on the first value, then 302 may include extracting the first information from specified positions of the authorization code, and the first value may be calculated by using a preset operation according to the first information; if the authorization code is encrypted data, the data before encryption may carry the first information, the first information may include the first value, then 302 may include decrypting the authorization code to obtain the decrypted authorization code, and the first value may be extracted from specified positions of the decrypted authorization code; and if the authorization code is encrypted data, the data before encryption may carry the first information, the first information may be the information obtained by performing data processing on the first value, then 302 may include decrypting the authorization code to obtain the decrypted authorization code, the first information may be extracted from specified positions of the decrypted authorization code, and the first value may be calculated according to the first information using a preset operation.

In the method shown in FIG. 3, the first value indicated by the first information in the authorization code may be used to configure the first parameter value of the device monitoring system. Therefore, the maximum quantity of image forming devices monitored by the device monitoring system may be configured through the authorization code, which may prevent excessive image forming devices monitored by the server of the device monitoring system, control the data processing volume of the server to ensure the data processing efficiency of the server, thereby ensuring the monitoring effect of the device monitoring system on the image forming device and improving the user experience.

Figure 4:
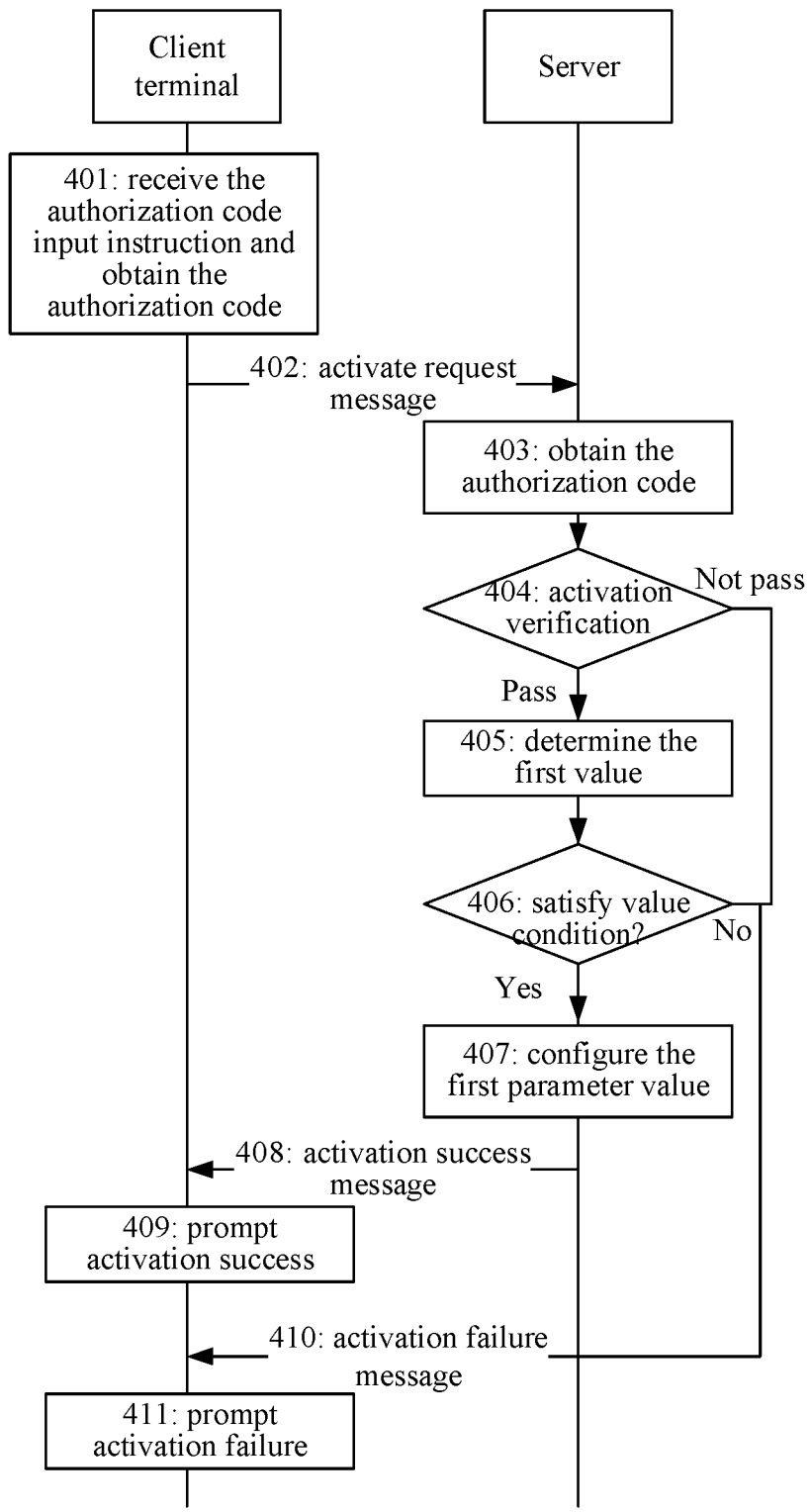
FIG. 4 illustrates a flowchart of another exemplary device monitoring method provided by exemplary embodiments of the present disclosure.

FIG. 4 illustrates a flowchart of another exemplary device monitoring method provided by exemplary embodiments of the present disclosure. As shown in FIG. 4, the method may include following exemplary steps.

At 401, the client terminal may receive the authorization code input instruction and obtain the authorization code.

Figure 5A:
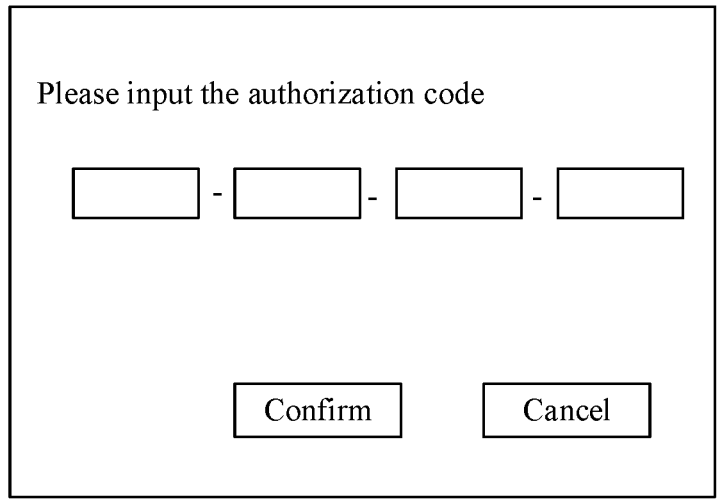
FIGS. 5A-5C illustrate schematics of a user interface (UI) in a device monitoring method provided by exemplary embodiments of the present disclosure.

Optionally, the client terminal may display the authorization code input interface to the user. For example, as shown in FIG. 5A, an authorization code input control may be configured in the authorization code input interface, and the user may input the authorization code provided by the provider of the device monitoring system in the authorization code input control and select the "confirm" control. Correspondingly, the client terminal may receive the authorization code input instruction and obtain the authorization code inputted by the user from the authorization code input control on the authorization code input interface.

At 402, the client terminal may transmit an activation request message to the server, and the activation request message may carry the authorization code.

At 403, the server may receive the activation request message and obtain the authorization code from the activation request message.

At 404, the server may perform activation verification on the authorization code. If the verification passes, 405 may be executed, and if the verification fails, 410 may be executed.

In an optional implementation manner, the activation verification of the authorization code by the server in such step may include verifying data format of the information included in the authorization code, and/or verifying data content of the information included in the authorization code. If the verification passes, the activation verification may pass, otherwise, the activation verification may fail.

If the authorization code includes the activation information and the first information, the data format and data content may be verified only for the activation information, or the data format and data content may be verified for both the activation information and the first information, which may not be limited in various embodiments of the present disclosure.

Different information included in the authorization code may be configured in different data formats. Therefore, when verifying the data formats of the information included in the authorization code, it may respectively determine whether each type of information satisfies the data format requirement corresponding to the information.

Different information included in the authorization code may be preset with different data content requirements. Therefore, when verifying the data contents of the information included in the authorization code, it may respectively determine whether each type of information satisfies the data content requirement corresponding to the information.

At 405, the server may determine the first value according to the authorization code.

The implementation of this step may refer to 302, which may not be described in detail herein.

The execution order between 404 and 405 may not be limited, for example, 405 may be executed after 403, and then 404 may be executed.

At 406, the server may determine whether the first value satisfies a preset value condition; and if yes, execute 408, and if not, execute 410.

Referring to the description about activating verification in 404, the numerical conditions in this step may include the verification condition of data format and/or the verification condition of data content.

For example, the validation condition for the data format of the first value may include, but not be limited to, that the first value is a decimal number; and the verification condition for the data content of the first value may include, but not be limited to, that the first value is in a preset value range.

If the first information includes the first value, since the data format and data content of the first value have been verified in 404, 406 may be omitted.

At 407, the server may configure the first parameter value according to the first value.

At 408, the server may transmit an activation success message to the client terminal.

The execution order between 407 and 408 may not be limited.

At 409, in response to the activation success message, the client terminal may prompt the user that the activation is successful, and the flow of this branch may be terminated.

Figure 5B:
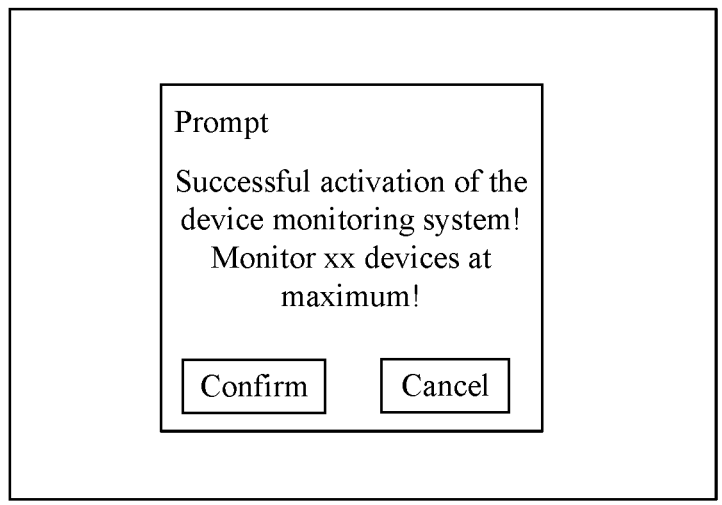

Optionally, as shown in FIG. 5B, the client terminal may transmit prompt information of successful activation to the device monitoring system of the user to prompt the user that the authorization code verification is successful. In addition, the client terminal may also prompt the device monitoring system of the user in the prompt information about the maximum quantity of image forming devices that can be monitored, that is, the first value, as shown in FIG. 5B exemplarily.

At 410, the server may transmit an activation failure message to the client terminal.

At 411, in response to the activation failure message, the client terminal may prompt the user that the activation fails.

Figure 5C:
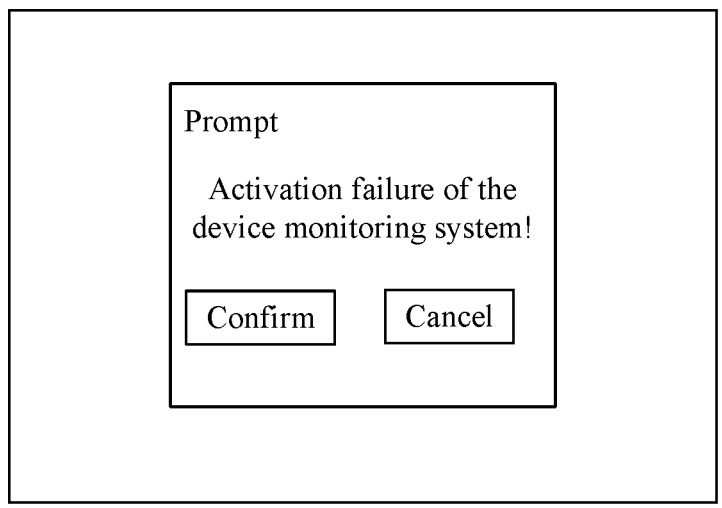

Optionally, as shown in FIG. 5C, the client terminal may transmit activation failure prompt information to the device monitoring system of the user to prompt the user that the authorization code verification fails.

In the method shown in FIG. 4, the server may determine whether the device monitoring system is successfully activated, not only according to the activation verification of the authorization code, but also according to the determination result of whether the first value satisfies the preset value condition. Therefore, compared with the method shown in FIG. 3, the processing process in the server may be further improved, so that the activation verification of the device monitoring system by the server may be more accurate and complete.

Figure 6:
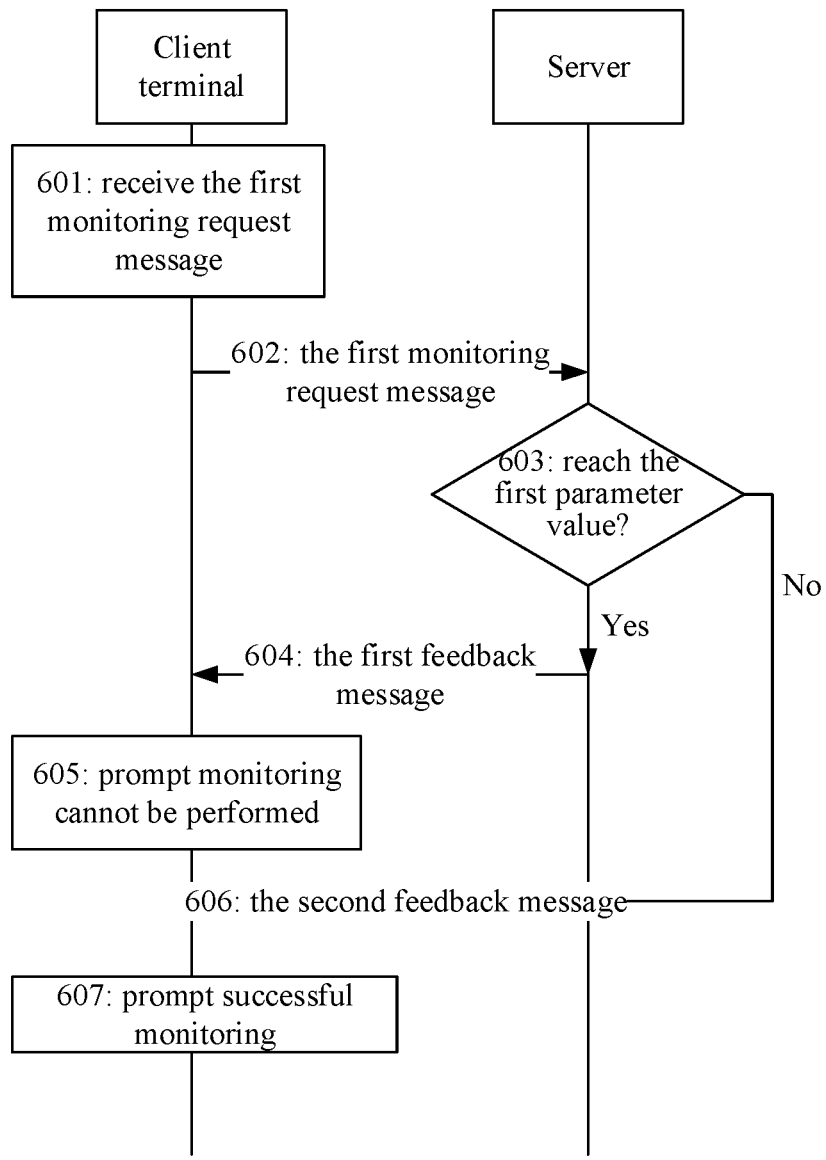
FIG. 6 illustrates a flowchart of another exemplary device monitoring method provided by exemplary embodiments of the present disclosure.

In one embodiment shown in FIG. 4, after the server configures the parameter of the maximum monitoring quantity in 407, when the user wishes to introduce the image forming devices to be monitored from the client terminal to the device monitoring system, the server may control the quantity of image forming devices introduced into the device monitoring system according to the maximum monitoring quantity. As shown in FIG. 6, the device monitoring method of the present disclosure may further include following exemplary steps.

At 601, the client terminal may receive the first monitoring request message, where the first monitoring request message may be configured to request monitoring of the first image forming device.

The first image forming device may be any image forming device that is not monitored by the device monitoring system.

Figure 7A:
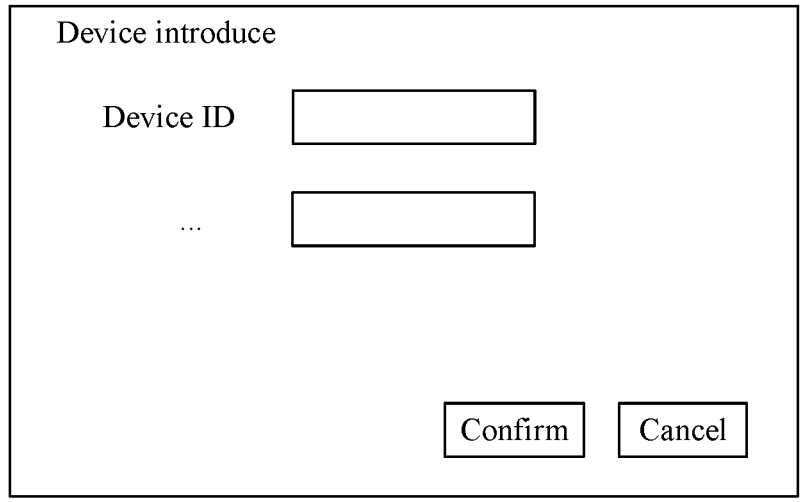
FIGS. 7A-7C illustrate schematics of a user interface (UI) in a device monitoring method provided by exemplary embodiments of the present disclosure.

Optionally, the client terminal may display the device introducing interface to the user. For example, as shown in FIG. 7A, several controls may be configured in the device introducing interface. The user may input the introducing information of the first image forming device according to the controls, such as the device ID and the like, and then the user may select the "confirm" control. Correspondingly, the client terminal may receive the first monitoring request message, and the first monitoring request message may include introducing information of the first image forming device.

At 602, the client terminal may transmit the first monitoring request message to the server.

At 603, in response to the first monitoring request message, the server may determine whether the quantity of monitored image forming devices reaches the first parameter value; and if yes, execute 604, and if not, execute 606.

At 604, the server may transmit the first feedback message to the client terminal, where the first feedback message may be configured to indicate to reject monitoring the first image forming device.

At 605, in response to the first feedback message, the client terminal may prompt the user that the first image forming device cannot be monitored, and this branch flow may be terminated.

Figure 7B:
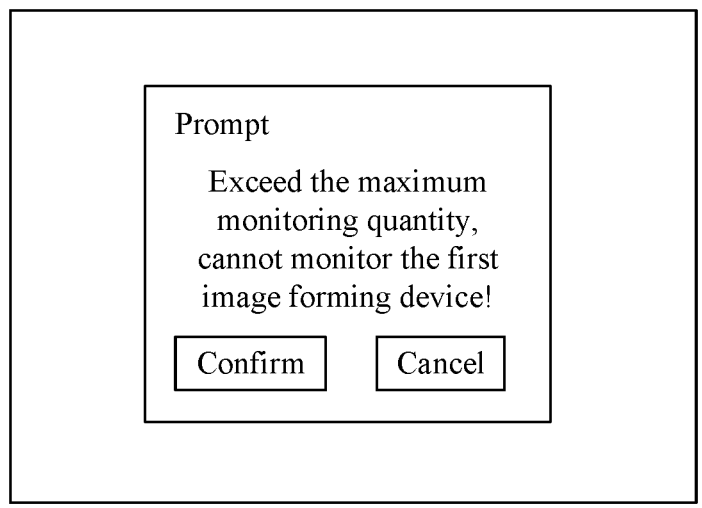

For example, as shown in FIG. 7B, the client terminal may display the text information that the first image forming device cannot be monitored to the user, thereby prompting the user that the first image forming device cannot be monitored.

At 606, the server may start monitoring the first image forming device and transmit the second feedback message to the client terminal, where the second feedback message may be configured to indicate that the first image forming device is successfully monitored.

Referring to one embodiment in 601, the server may obtain the introducing information of the first image forming device from the first monitoring request message and start monitoring the first image forming device according to the introducing information of the first image forming device; and implementation process may not be limited in various embodiments of the present disclosure.

At 607, in response to the second feedback message, the client terminal may prompt the user that the first image forming device is successfully monitored, and this branch flow may be terminated.

Figure 7C:
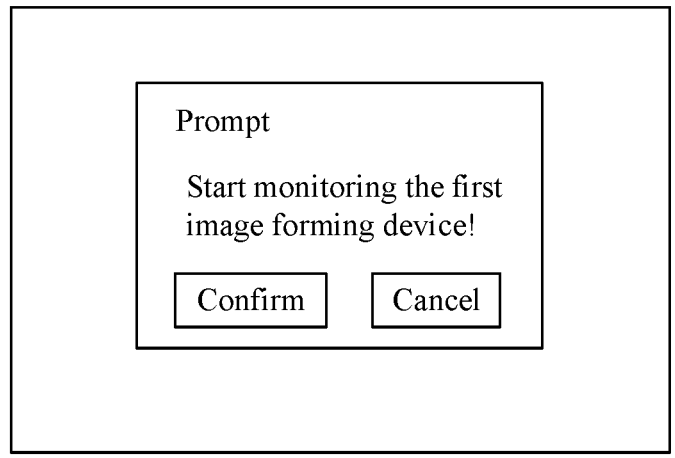

For example, as shown in FIG. 7C, the client terminal may display the text information of start monitoring the first image forming device to the user to prompt the user to start monitoring the first image forming device.

In the method shown in FIG. 6, the server may monitor the maximum quantity of image forming devices that can be monitored by the device monitoring system according to the first parameter value, which may prevent excessive image forming devices monitored by the server of the device monitoring system, control the data processing volume of the server to ensure the data processing efficiency of the server, thereby ensuring the monitoring effect of the device monitoring system on the image forming device and improving the user experience.

It can be understood that some or all steps or operations in above-mentioned embodiments are only exemplary, and other operations or variations of various operations may also be performed in embodiments of the present disclosure. Furthermore, various steps may be performed in a different order presented in above-described embodiments and all operations in above-described embodiments may not be performed.

Figure 8:
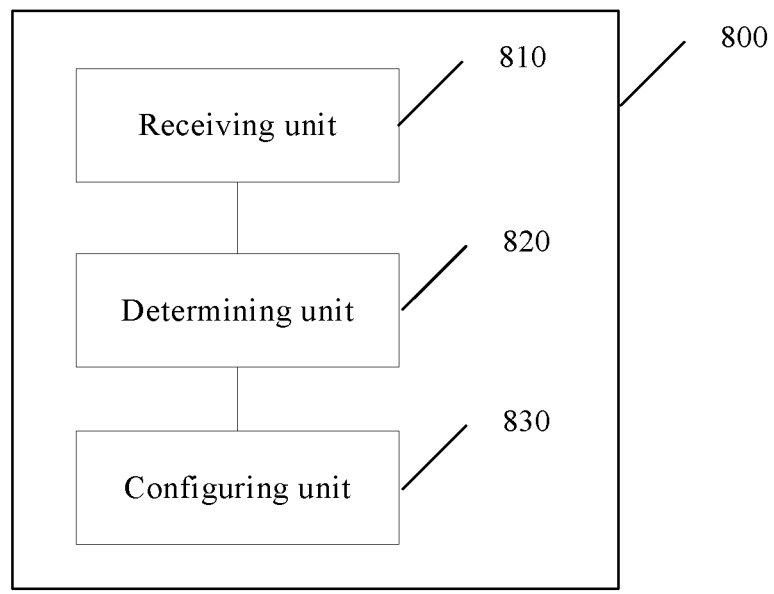
FIG. 8 illustrates a structural schematic of an exemplary device monitoring apparatus provided by exemplary embodiments of the present disclosure.

FIG. 8 illustrates a flowchart of another exemplary device monitoring apparatus provided by exemplary embodiments of the present disclosure. As shown in FIG. 8, the apparatus 800 may include a receiving unit 810, configured to receive the authorization code, where the authorization code may include the first information, the first information may be configured to indicate the first value, and the first value may be the maximum quantity of image forming devices that can be monitored by the device monitoring system activated using the authorization code; a determining unit 820, configured to determine the first value according to the authorization code; and a configuring unit 830, configured to configure the first parameter value according to the first value, where the first parameter value may be configured to record the maximum quantity of image forming devices that can be monitored.

Optionally, the receiving unit 810 may be further configured to receive the first message, where the first message may be configured to request monitoring of the first image forming device; and the first image forming device may be an image forming device that is not monitored.

The apparatus may further include a first transmitting unit configured to transmit the second message if the quantity of monitored image forming devices reaches the first parameter value, and the second message may be configured to indicate to reject monitoring the first image forming device.

Optionally, the apparatus may further include a deciding unit, configured to decide whether the first value satisfies a preset numerical condition, and if yes, instruct the configuring unit to configure the first parameter value according to the first value, and instruct the second transmitting unit to transmit the third message; and a second transmitting unit, configured to transmit the third message, where the third message is configured to indicate activation failure.

Optionally, if the authorization code is not encrypted, the first information may include the first value; and the determining unit 820 may be configured to extract the first information from specified positions of the authorization code and use the extracted first information as the first value.

Or, if the authorization code is not encrypted, the first information may be information obtained by performing data processing on the first value; and the determining unit 820 may be configured to extract the first information from specified positions of the authorization code and calculate the first value according to the first information.

Or, if the authorization code is encrypted data, the data before encryption may carry the first information, and the first information may include the first value; and the determining unit 820 may be configured to decrypt the authorization code to obtain the decrypted authorization code and extract the first value from specified positions of the decrypted authorization code.

Or, if the authorization code is encrypted data, the data before encryption may carry the first information, and the first information may be information obtained by performing data processing on the first value; and the determining unit 820 may be configured to decrypt the authorization code to obtain the decrypted authorization code, extract the first information from specified positions of the decrypted authorization code, and calculate the first value according to the first information.

The apparatus provided by embodiments shown in FIG. 8 may be used to implement technical solutions of method embodiments shown in FIGS. 3-6 of the present disclosure; and the implementation principle and technical effect may be further referred to related descriptions in method embodiments.

It can be understood that the division of all units of the apparatus shown in FIG. 8 above may only be a division of logical functions, and all units may be fully or partially integrated into a physical entity in actual implementation or may be physically separated. In addition, these units may all be implemented in the form of software by invoking processing elements and may also all be implemented in the form of hardware; and some units may also be implemented in the form of software by invoking processing elements, and some units may be implemented in the form of hardware. For example, the receiving unit may be a separately established processing element or may be integrated in a certain chip of the electronic device. The implementation of other units may be similar to that of the receiving unit. In addition, all or part of these units may be integrated and may also be implemented independently. In an implementation process, each step of the above-mentioned method or each of the above-mentioned units may be completed by an integrated logic circuit of hardware in the processor elements or an instruction in the form of software.

For example, the above-mentioned units may be one or more integrated circuits configured to implement the above-mentioned method, such as one or more application specific integrated circuits (ASIC), or one or more microprocessors (e.g., digital signal processor, DSP), or one or more field programmable gate arrays (FPGA), and the like. For another example, these units may be integrated together and implemented in the form of a system-on-a-chip (SOC).

Embodiments of the present disclosure provide a server, including a processor configured to execute the methods provided by various embodiments shown in FIGS. 3-6 of the present disclosure.

Embodiments of the present disclosure also provide a device monitoring system, including a client terminal and a server; and the client terminal and the server may cooperate to execute the methods provided by various embodiments shown in FIGS. 3-6 of the present disclosure.

Embodiments of the present disclosure also provide a computer-readable storage medium, where a computer program may be stored in the computer-readable storage medium, and when being executed on a computer, the computer program may make the computer execute the methods provided by various embodiments shown in FIGS. 3-6 of the present disclosure.

Embodiments of the present disclosure also provide a computer program product, where the computer program product may include a computer program, and when being executed on a computer, the computer program may make the computer execute the methods provided by various embodiments shown in FIG. 3-6 of the present disclosure.

In embodiments of the present disclosure, "at least one" refers to one or more, and "a plurality of" refers to two or more. "And/or" may describe the association relationship of the associated objects, indicating that there can be three types of relationships, for example, A and/or B, which can mean the situation where A exists alone, A and B exist at the same time, and B exists alone, where A and B may be singular or plural. The character "/" may normally indicate that associated objects before and after are in an "or" relationship. "The following at least one item" and similar expressions may refer to any combination of these items, including any combination of singular items or plural items. For example, at least one of a, b, and c may represent: a, b, c, a-b, a-c, b-c, or a-b-c, where a, b, and c can be singular or plural.

Those skilled in the art should understand that the units and algorithm steps described in embodiments disclosed in the present disclosure may be implemented by a combination of electronic hardware, computer software, and electronic hardware. Whether these functions are executed by hardware or software may depend on specific application and design constraint conditions of the technical solutions. Those skilled in the art may use different methods for each application to implement the described functions, but such implementation should not be considered as beyond the scope of the present disclosure.

Those skilled in the art may clearly understand that, for the convenience and conciseness of the description, the working process of the system, apparatus and unit described above may refer to corresponding process in above-mentioned method embodiments, which may not be described in detail herein.

In some embodiments provided in the present disclosure, if any function is implemented in the form of a software functional unit and sold or used as an independent product, it may be stored in a computer-readable storage medium. Based on such understanding, the technical solutions of the present disclosure or parts that make contributions to the existing technology or parts of the technical solutions may be essentially embodied in the form of software products. The computer software product may be stored in a storage medium and include several instructions to cause a computer device (which may be a personal computer, a server, a network device, or the like) to execute all or part of the steps of the methods described in various embodiments of the present disclosure. The above-mentioned storage media may include various media that can store program codes, such as U disks, removable hard disks, read-only memory (ROM), random-access-memory (RAM), magnetic disks, optical disks, and the like.

The above are only specific embodiments of the present disclosure. Changes or substitutions which can be easily thought by those skilled in the art within the technical scope disclosed by the present disclosure should be covered by the protection scope of the present disclosure. The protection scope of the present disclosure shall be subject to the protection scope of the claims.

What is claimed is:

1. A device monitoring method, comprising:
   receiving an authorization code, including first information configured to indicate a first value, and the first value being a maximum quantity of image forming devices capable of being monitored by a device monitoring system which is activated by the authorization code;
   determining the first value according to the authorization code;
   configuring a first parameter value according to whether the first value satisfies a preset numerical condition, wherein the first parameter value is configured to record the maximum quantity of image forming devices capable of being monitored, and wherein configuring the first parameter value comprises:
   before configuring the first parameter value, determining whether the first value satisfies the preset numerical condition; and
   in response to a determination that the first value satisfies the preset numerical condition, configuring the first parameter value according to the first value, and in response to a determination that the first value does not satisfy the preset numerical condition, transmitting a message to indicate an activation failure.

2. The method according to claim 1, further comprising:
   transmitting a message in response to a determination that a quantity of monitored image forming devices reaches the first parameter value.

3. The method according to claim 1, further comprising:
   in response to a determination that the authorization code is not encrypted, determining the first information includes the first value; or
   in response to a determination that the authorization code is not encrypted, determining the first information is information obtained by performing data processing on the first value.

4. The method according to claim 3, wherein
   in response to the determination that the authorization code is not encrypted, determining the first value according to the authorization code comprises extracting the first information from the authorization code and using the extracted first information as the first value.

5. The method according to claim 3, wherein
   in response to the determination that the authorization code is not encrypted, determining the first value according to the authorization code comprises extracting the first information from the authorization code and calculating the first value according to the first information.

6. The method according to claim 3, wherein
   in response to a determination that the authorization code is encrypted data, data before encryption carries the first information, and the first information includes the first value.

7. The method according to claim 3, wherein
   in response to a determination that the authorization code is encrypted data, data before encryption carries the first information, and the first information is information obtained by performing data processing on the first value.

8. The method according to claim 1, wherein:
   before the device monitoring system is activated, the first parameter value is a default value or 0.

9. A server, comprising:
   a processor for implementing an image forming control method, wherein the processor is configured to:
   receive an authorization code, including first information configured to indicate a first value, and the first value being a maximum quantity of image forming devices capable of being monitored by a device monitoring system which is activated by the authorization code;
   determine the first value according to the authorization code;
   configure a first parameter value according to whether the first value satisfies a preset numerical condition, wherein the first parameter value is configured to record the maximum quantity of image forming devices capable of being monitored, and wherein configuring the first parameter value comprises:

before configuring the first parameter value, determining whether the first value satisfies the preset numerical condition; and in response to a determination that the first value satisfies the preset numerical condition, configuring the first parameter value according to the first value, and in response to a determination that the first value does not satisfy the preset numerical condition, transmitting a message to indicate an activation failure.

10. The server according to claim 9, wherein the processor is further configured to:

transmit a message in response to a determination that a quantity of monitored image forming devices reaches the first parameter value.

11. The server according to claim 9, wherein the processor is further configured to:

in response to a determination that the authorization code is not encrypted, determine the first information includes the first value; or in response to a determination that the authorization code is not encrypted, determine the first information is information obtained by performing data processing on the first value.

12. The server according to claim 9, wherein:

before the device monitoring system is activated, the first parameter value is a default value or 0.

13. A non-transitory computer-readable storage medium, containing a computer program for, when being executed by a processor, performing an image forming control method, the image forming control method comprising:

determining the first value according to the authorization code;

configuring a first parameter value according to whether the first value satisfies a preset numerical condition, wherein the first parameter value is configured to record the maximum quantity of image forming devices capable of being monitored, and wherein configuring the first parameter value comprises:

before configuring the first parameter value, determining whether the first value satisfies the preset numerical condition; and in response to a determination that the first value satisfies the preset numerical condition, configuring the first parameter value according to the first value, and in response to a determination that the first value does not satisfy the preset numerical condition, transmitting a message to indicate an activation failure.

14. The storage medium according to claim 13, wherein the method further includes:

transmitting a message in response to a determination that a quantity of monitored image forming devices reaches the first parameter value.

15. The storage medium according to claim 13, wherein the method further includes:

in response to a determination that the authorization code is not encrypted, determining the first information includes the first value; or in response to a determination that the authorization code is not encrypted, determining the first information is information obtained by performing data processing on the first value.

16. The storage medium according to claim 13, wherein:

before the device monitoring system is activated, the first parameter value is a default value or 0.

* * * * *